June 25, 1968   H. W. PRATT   3,389,674
LIQUID GYRO STABILIZER
Filed Feb. 1, 1966
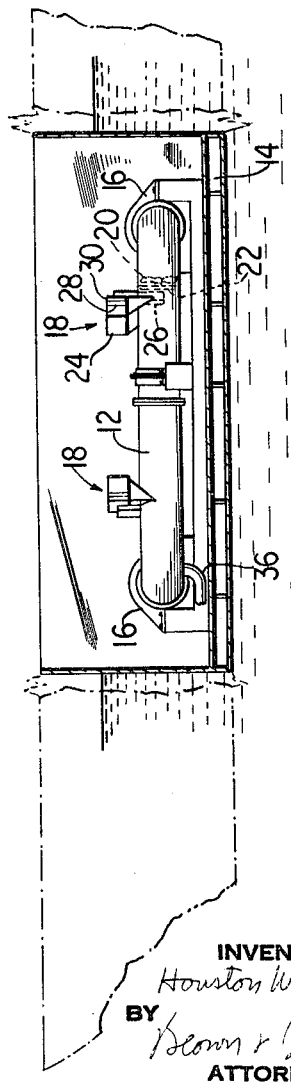
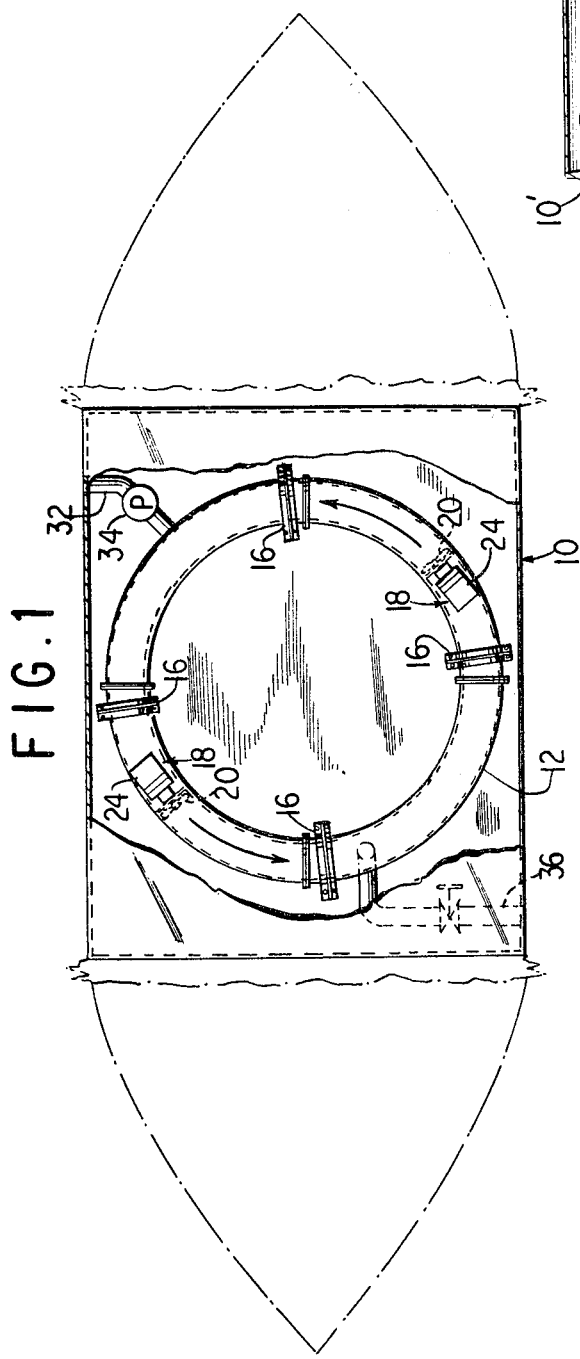
INVENTOR
Houston W. Pratt
BY
*Brown & Seward*
ATTORNEYS United States Patent Office 3,389,674
Patented June 25, 1968

3,389,674
LIQUID GYRO STABILIZER
Houston W. Pratt, 90 Duck Pond Road,
Glen Cove, N.Y. 11542
Filed Feb. 1, 1966, Ser. No. 524,039
3 Claims. (Cl. 114—122)

ABSTRACT OF THE DISCLOSURE

A stabilizer for a fluid-supported body or vehicle comprising one or more endless annular conduits fixed to the body or vehicle and containing a liquid mass, with means for causing said mass to flow in said conduit or conduits the gyroscopic inertia of said mass being used directly for the stabilization of the body or vehicle to which the conduit is fixed.

Field of the invention

Fluid mass gyroscopes have heretofore been used in instruments to provide a control signal indicating deviation from some reference point. These known gyroscopes, designed for use in such delicate miniaturized instruments as are found in aircraft, employed an annular raceway mounted for pivotal movement about a diametral axis and responsive to a forced precession as a high density liquid material was driven around the raceway. Since the annular raceway was pivoted to the instrument, the gyroscopic inertia was not used for direct stabilization but merely to provide an indication of deviation from a reference line. According to the present invention, an annular, endless conduit is secured to a body or vehicle to be stabilized (e.g., barge, ship or the like) so that the gyroscopic effect of a liquid driven around the conduit is used directly to stabilize the body.

Accordingly, an object of the invention is to utilize the gyroscopic inertia of a fluid mass gyroscope for stabilizing a body.

Another object is to establish forces tending to effect stabilization of a body about a plurality of axes.

A further object is to provide, in one embodiment, a fluid mass stabilizing gyroscope which is capable of using the fluid through or on which the body to be stabilized travels.

A further object is to provide certain improvements in the form, construction, arrangement and material of the several elements whereby the above named and other objects may be attained.

Practical embodiments of the invention are shown in the accompanying drawings wherein:

FIG. 1 is a plan view (parts being broken away) of a waterborne vehicle having a fluid mass stabilizing gyroscope therein.

FIG. 2 is an elevation of said vehicle, parts being in section and parts being broken away.

FIG. 3 is an elevation (partly in section) of an alternate embodiment.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed is for the purpose of description and not of limitation.

Referring to the drawings, FIG. 1 shows a waterborne body or vehicle 10 having an endless, annular conduit 12 secured to the main frame structure 14 by the mounting devices 16. A liquid is driven around the annular conduit 12 by the pumps or impellers indicated generally at 18. As illustrated, each pump 18 comprises a propeller 20 rotatably supported in the conduit 12 by the radial supports 22. The propeller 20 is driven by the externally mounted motor 24 through suitable gearing and shafts consisting of the right angle drive 26 along with reduction gearing 28 as may be required. A clutch 30 is interposed between the motor 24 and the propeller 20 to permit the latter to rotate freely. Thus both pumps 18 may be used simultaneously or one pump may be used while the propeller of the other pump freely rotates in the driven fluid without impeding the flow or the non-driving propeller blades may be feathered in a well-known manner.

The amount of gyroscopic inertia developed by the rotating mass of liquid depends on the speed of rotation, the radius of gyration, and the mass or density of the fluid. Any of these may be increased in magnitude to develop a greater gyroscopic inertia. The radius of gyration is fixed by the diameter of the annulus formed by the conduit 12 and cannot ordinarily be changed once the unit is constructed and installed. However, increased inertia may be obtained by speeding up the pumps 18 and driving the fluid at a faster rate. Also materials capable of being dissolved or suspended may be added to the liquid to increase its density. Thus when the stabilizing device is used on a waterborne barge, water taken directly from the sea, river, or lake through the pipe 32 and pump 34 may be used to initially fill the conduit 12 and soluble salts or other materials capable of being suspended in the water may be added. The water may be drained from the conduit 12 by the pipe 36. Other liquids having high densities (e.g. mercury) may also be used instead of water. The term "liquid" is used herein to designate solutions and suspensions as well as pure liquids.

It will be apparent that the fluid driven around the closed conduit 12 will provide a gyroscopic inertia tending to stabilize the vehicle in a horizontal plane and about all axes contained in a horizontal plane.

In the alternate embodiment of FIG. 3, two annular, endless conduits 38, 39 are superimposed on one another and both are secured to the vehicle 10' by the mounting devices 40. Fluid is driven through each conduit 38 and 39 in the same way as in the FIG. 1 embodiment and accordingly, the pumps for this purpose are not shown. Since the gyroscopic inertia of the driven fluid mass in each conduit 38 and 39 supplements that in the other, a more compact and effective installation is provided. By driving the fluids in opposite directions, precessional forces can be made to cancel out. It will be understood that any number of endless conduits may be employed as desired, the distribution of a plurality of conduits or pairs of conduits in the vehicle being a matter of choice. Thus, one endless conduit may be located in the forward part of the vehicle and another in the rear, or two or more conduits may be arranged side by side. Any number of conduits may be located at different elevations of the vehicle, aligned one above the other as in the FIG. 3 embodiment or offset from each other. When employing a plurality of endless conduits on a single vehicle, there may be variations in the conduit diameters, the radii of the closed paths, and the densities of the fluids employed in the various conduits.

Although the above description indicates the use of propellers or impellers for driving the fluid around the endless conduit, it will be understood that other types of pumps or other forms of driving means may be employed. For example, instead of a pump, a nozzle or jet discharging a recirculated stream of liquid into the endless conduit may be used to induce the closed circuit flow. Also, where liquids (e.g. mercury) having electrically conductive or magnetic properties are used in the endless conduit, the driving force may be imparted by the interaction of electromagnetic flux and electric current wherein an electric motor circuit, comprising permanent magnets and a direct current source, is disposed about an external section of the endless conduit so that the magnetic field extends through to the liquid to drive the latter.

The apparatus of the present invention may be used to stabilize any fluid-supported body including waterborne vehicles (described above), ground-effect machines which are supported on layers of air, and all types of airborne vehicles, including amphibious aircraft wherein stabilization is effected in the air and on the water.

It will be understood that various changes may be made in the form, construction and arrangement of the several parts without departing from the spirit and scope of the invention, and hence I do not intend to be limited to the details shown or described herein except as the same are included in the claims or may be required by disclosures of the prior art.

What I claim is:

1. A device for stabilizing a body supported by a fluid, comprising first and second endless annular conduits fixed to said body and each defining a closed path of travel for a liquid, means driving said liquid around said first conduit at a velocity sufficient to develop a gyroscopic inertia tending to stabilize said body, and means driving said liquid around said second conduit in a manner to develop a gyroscopic inertia supplementing that developed in the first said conduit, said conduits being disposed in a generally horizontal plane and said second conduit being disposed at an elevation different from that of the first conduit.

2. A device for stabilizing a body supported by a fluid, comprising first and second endless annular conduits fixed to said body and each defining a closed path of travel for a liquid, means driving said liquid around said first conduit at a velocity sufficient to develop a gyroscopic inertia tending to stabilize said body, and means driving said liquid around said second conduit in a manner to develop a gyroscopic inertia supplementing that developed in the first said conduit, said conduits being disposed in a generally horizontal plane and the liquid in said second conduit being driven in a direction opposite to the direction of liquid travel in the first said conduit.

3. A device for stabilizing a body supported by a fluid, comprising first and second endless annular conduits fixed to said body and each defining a closed path of travel for a liquid, means driving said liquid around said first conduit at a velocity sufficient to develop a gyroscopic inertia tending to stabilize said body, and means driving said liquid around said second conduit in a manner to develop a gyroscopic inertia supplementing that developed in the first said conduit, said conduits being disposed in a generally horizontal plane, the diameters of said conduits and the diameters of the annuli formed by said conduits being substantially the same and said conduits being aligned one above the other.

References Cited

UNITED STATES PATENTS

| | | | |
|---|---|---|---|
| 2,856,142 | 10/1958 | Haviland | 244—79 X |
| 2,952,235 | 9/1960 | Salomon | 114—125 |
| 2,953,925 | 9/1960 | Yeadon | 74—5.7 |
| 3,097,818 | 7/1963 | Heller | 244—79 X |

MILTON BUCHLER, *Primary Examiner.*

T. M. BLIX, *Assistant Examiner.*